Patented Mar. 3, 1936

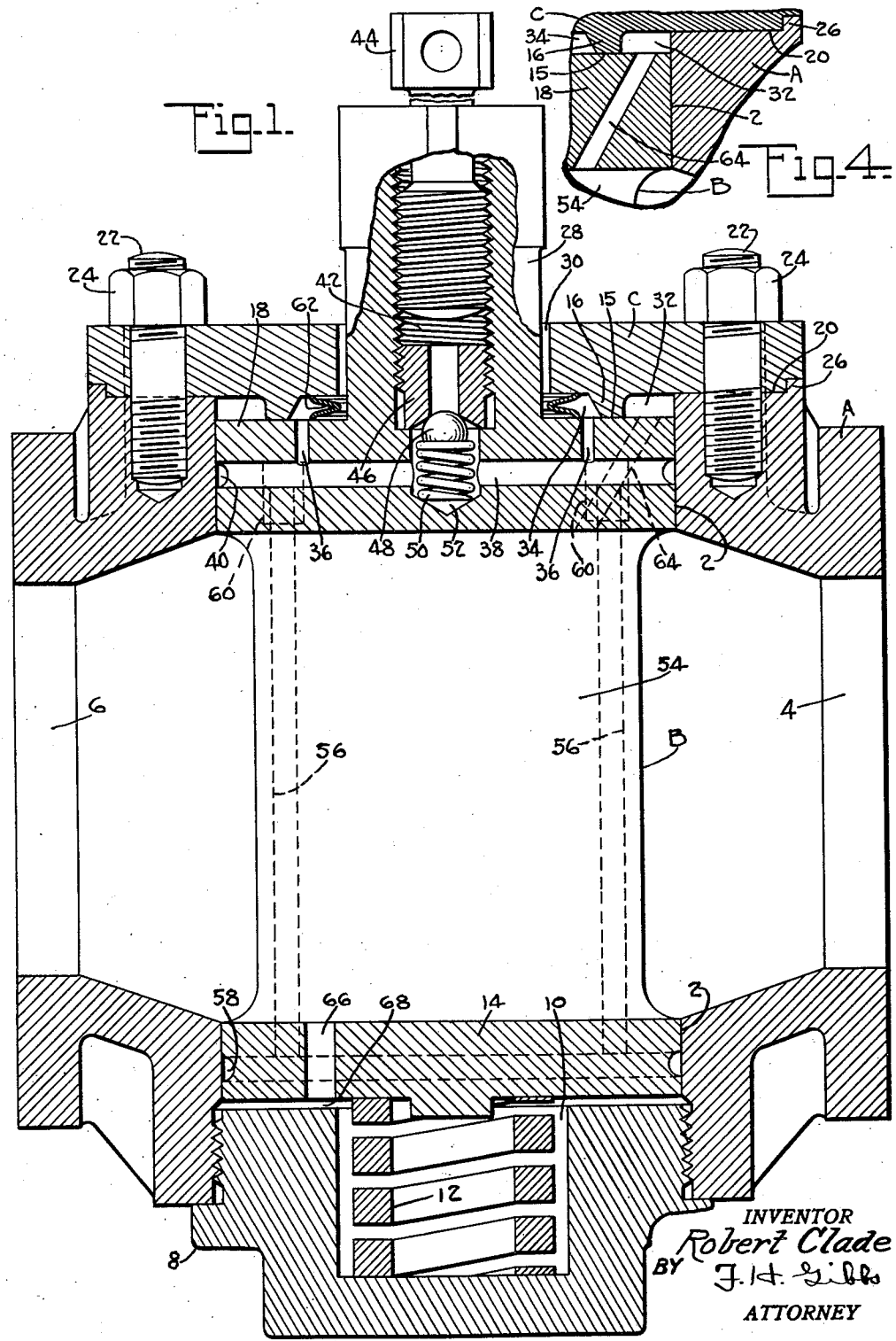

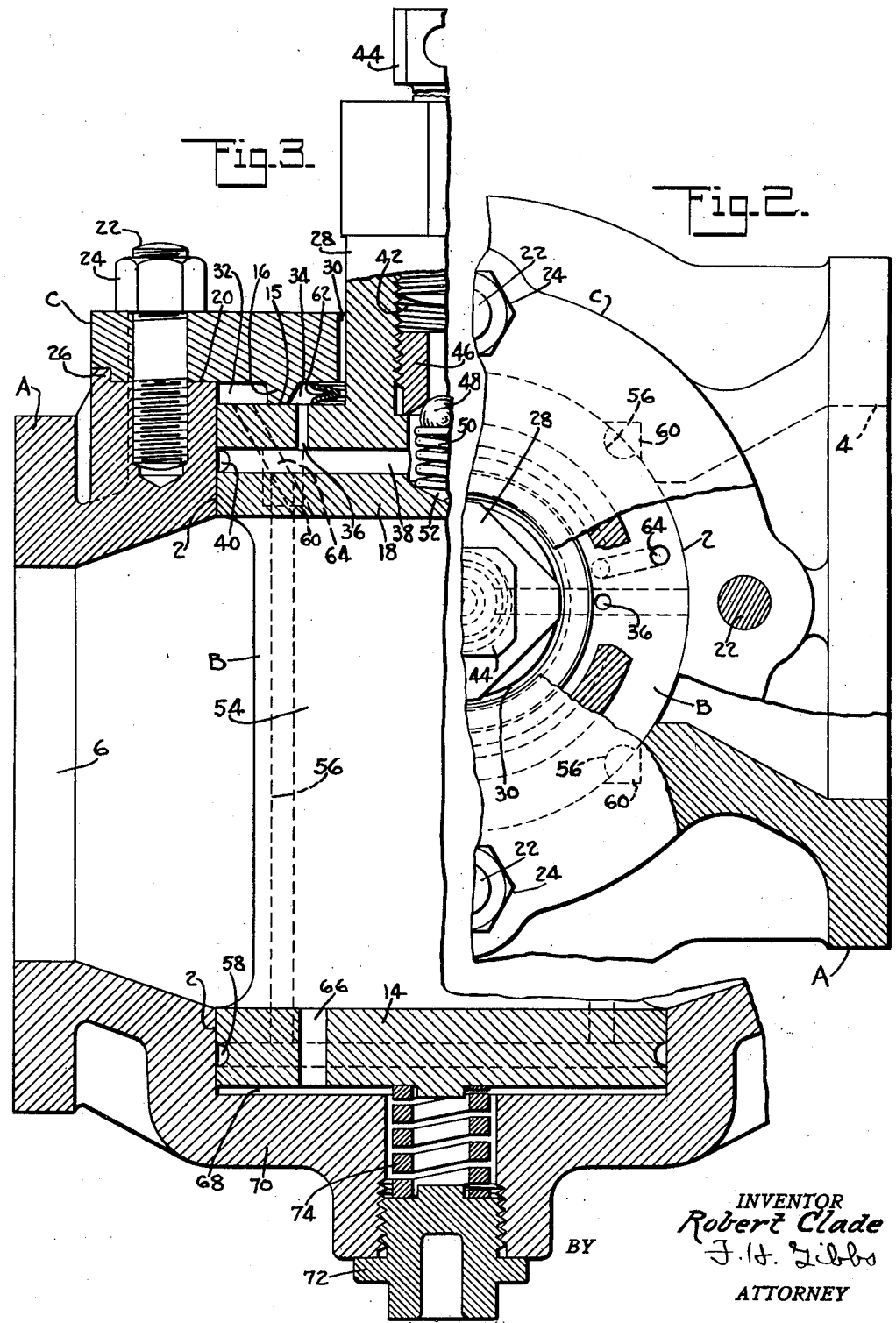

2,032,352

UNITED STATES PATENT OFFICE 2,032,352

LUBRICATED VALVE

Robert Clade, Detroit, Mich., assignor to American Car and Foundry Company, New York, N. Y., a corporation of New Jersey Application October 10, 1933, Serial No. 692,950

13 Claims. (Cl. 251—93)

This invention relates generally to valves of the type in which lubricant is forced under pressure between cooperating surfaces of a valve body and a valve plug, the valves being known in the art as lubricated valves.

One object of this invention is the provision of a lubricated valve in which lubricant under pressure is forced directly to a lubricant chamber defined between overlapping portions of a valve plug and a valve body, at the head portion of the valve.

Another object of this invention is the provision of a valve having means for lubricating the contacting surfaces of the valve plug and valve body, said valve plug and valve body being relatively so arranged that when the valve has been sufficiently lubricated a visual signal is provided for advising an operator to this effect.

Still another object of this invention is the provision of a valve and means for forcing lubricant under pressure between overlapping portions of a valve plug and head portion for the valve, and a resilient sealing element interposed between overlapping portions of the plug and head portion and constituting one wall of a lubricant chamber.

A further object of this invention is the provision of a lubricated valve in which the plug therefor is insertible into the valve body through the upper end portion of the latter and said valve being normally sealed against leakage of lubricant by a sealing element overlapping portions of the plug and the head portion of the valve so as to permit the normal radial shifting of the plug within the body under the influence of line pressure thereagainst when the valve is in closed position.

It is well known in the art that when a valve is in closed position line pressure against the plug which causes radial shifting of the plug in the body results in a clearance between the body and plug which is greatest adjacent the ingress port and progressively decreases circumferentially of the plug toward the egress port. This condition permits line pressure to pass below the plug to act against the lower end of the plug and tend to force the latter axially in the body. In lubricated valves of the type shown herein, and in which a seal against head leaks is effected at the head portion of the valve by contact between the head portion and a plug part or the upper end of the plug, line pressure against the bottom of the plug obviously causes increased pressure at the contacting areas of the plug and head portion, whether the head portion be a removable member or a part formed integral with the body. In large valves which are subjected to proportionately increased line pressure, the pressure of the plug against the head portion is correspondingly greater and operation of the valve becomes increasingly difficult. In view of this, another object of this invention is to provide a lubricated valve in which head leaks are prevented by an annular lubricant seal between the upper end of the plug and the head portion, and in which valve the upper end of the plug and the head portion are normally maintained in sealing engagement, with means for permitting the passage of line pressure both above and below the plug whereby to relieve or reduce the pressure at the contacting areas of the plug and head portion.

A still further object of this invention is the provision of a valve including a body with a plug rotatable therein and a head portion for the body which overlaps the upper end of the plug and which is so formed as to provide concentrically arranged chambers around the stem of the plug, one of said chambers being adapted to receive lubricant under pressure to constitute a lubricant seal around the stem of the plug for preventing head leaks, and the other chamber being adapted to receive fluid under line pressure to counteract the otherwise excessive action of the line pressure against the bottom of the plug.

Other objects and advantages of this invention will be apparent from the following description taken in conjunction with the accompanying drawings, in which Figure 1 is a sectional view through the valve of the present invention showing one form thereof.

Fig. 2 is a partial top plan view of the valve shown in Figure 1 with certain parts broken away and other parts shown in section.

Fig. 3 is a sectional view through a part of a valve of the present invention showing a modified form thereof; and Fig. 4 is a sectional view of a portion of the valve shown in Figure 1, the view being taken adjacent the head portion of the valve.

Referring now more particularly to the drawings, in which similar characters of reference designate similar parts in the several views, the valve of the present invention comprises, in the main, a body A, a plug B, and a removable gland or head portion C. The valve is provided with a central longitudinal bore forming an internal seat 2 for the plug B. The valve shown is of the two-way type, but this is merely by way of example, and said valve is provided with ingress and egress ports 4 and 6 respectively.

In the form of valve shown in Fig. 1, the lower end portion of the valve body A is provided with an opening which is of at least as great a diameter as the plug seat 2, and said opening is normally closed by a removable base plate 8 having a recess 10 therein constituting a seat for a spring 12, which acts against the lower end 14 of the plug B and normally urges the plug axially in the body so that its upper end is retained in contact with the gland C, as more clearly described hereinafter.

In the instance shown in Fig. 1, the contacting of the upper end of the plug B and the gland C takes place at the machined seating surface 15 of a shoulder or abutment 16 formed with and depending from the gland C. The upper end 18 of the plug is also preferably machined so that a nice engagement of the seating surface 15 of the shoulder 16 therewith may be obtained; said engagement or contact being substantially a sealing contact. Within the spirit of the invention, it will be apparent that, if desired, the shoulder may be formed on the upper end of the plug instead of on the gland.

The upper end of the body A is provided with a seat 20 arranged in a plane above the seating surface 15 of shoulder 16 and on which the gland C is mounted. Suitable fasteners such as the bolts 22 with their securing nuts 24 are provided for securing the gland to the body A. The upper end of the body is provided with a peripheral shoulder 26 and the gland is provided with a cutout portion into which the shoulder 26 is fitted, the shoulder 26 constituting a positioning means for the gland C as will be obvious.

As clearly shown in Fig. 1, the shoulder 16 is preferably arranged intermediate the seat 2 of the body and the stem 28 of the plug, the latter extending through the gland C and being of a diameter such as to provide a clearance space 30 between the gland and stem. The specific positioning of the shoulder 16, as just described, results in the provision of concentrically arranged chambers 32 and 34 respectively, chamber 32 being defined between overlapping portions of the plug and gland C, and the seat 2 of the body and the shoulder 16, while the chamber 34 is defined between overlapping portions of the plug and head portion or gland C and shoulder. The chamber 34 constitutes a lubricant chamber which receives lubricant under pressure through a port 36 which extends between the chamber 34 and a transverse lubricant duct 38 formed in the upper end portion of the plug and extending to and communicating with a circumferential lubricant groove 40. In practice a pair of ports 36 are provided, as clearly shown in Fig. 1. The stem 28 of the plug is hollow to provide a lubricant reservoir 42 in which a ram 44 is operable to force lubricant into the duct 38 through a ported valve seat member 46 arranged in the lower end of the lubricant chamber 42 and normally closed by a ball valve 48 retained against said valve seat by a spring 50 supported in a seat 52 in the upper end portion of the plug. It can be seen that operation of the ram 44 will force lubricant from the reservoir past the ball valve 52 and into the duct 38 from where it passes into the lubricant chamber 34 through the ports 36. Lubricant under pressure also is forced from the duct 38 into the circumferential groove 40.

Formed between contacting surfaces of the plug B and the body A, and, in the instance shown, formed in the body portion 54 of the plug, are longitudinally arranged lubricant grooves 56. In the instance shown in the drawings the lower ends of these grooves 56 terminate at and communicate with a lubricant arresting groove 58 formed circumferentially in the lower end portion of the plug. This specific arrangement of grooves, however, is merely by way of example as, within the spirit of this invention, one or more of the grooves 56 may terminate above the arresting groove 58 whereby said groove or grooves do not communicate with said arresting groove. The upper ends of the lubricant grooves 56 terminate at and communicate with the circumferential groove 40 and, formed in the body A are dwarf grooves 60 which are overlapped by the grooves 56 when the plug B is in certain positions within the body.

To normally prevent escape of lubricant from the lubricant chamber 34 through the space 30, a sealing element is interposed between the upper end of the plug and the gland C. In the instance shown this sealing element comprises a ring-like resilient metal member 62, substantially V-shaped in section, with the end portions of the arms thereof in engagement with the upper end of the plug and the lower surface of the gland C, whereby increased pressure within the lubricant chamber 34 tends to force the arms in still closer engagement with the plug and head portion or gland C to thus seal the lubricant chamber against leakage. As clearly shown in Fig. 1, the sealing element 62 is positioned within the lubricant chamber 34 and constitutes one wall thereof. The plug B is provided with an opening therethrough adapted to be alined with the ports 4 and 6 of the body, and, formed in the upper end portion of the plug is a line pressure duct 64 which extends between the interior of the plug B and the line pressure chamber 32 whereby fluid under line pressure may pass from the chamber 32 into the interior of the plug.

In the valve of the present invention the lower end portion 14 thereof is provided with a leak port 66 which connects the interior of the plug with the space 68 between the base plate 8 and the lower end of the plug.

In the valve shown in Fig. 3, parts similar to that shown in Fig. 1 are similarly indicated. The valve differs from Fig. 1, however, in providing an integral base plate 70 having an opening therethrough which supports a plug 72 constituting a seat for the spring 74.

In operation, with the valve fully lubricated, whereby lubricant under pressure is contained in the chamber 34 and in the circumferential groove 40, the plug grooves 56 and the arresting groove 58, and lubricant obviously between the contacting surfaces of the body portion 54 of the plug and the plug seat 2, with line pressure passing through the valve (the valve being in open position), any fluid under pressure in chamber 32 at the head portion of the valve will be discharged into the interior of the plug B and be carried away out of the egress port 6.

With the valve in closed position, and line pressure acting against the plug, the plug becomes eccentrically arranged in the body and fluid under line pressure will pass below the plug and also into the chamber 32 at the upper end of the valve; it being obvious that when a valve is moved from open to closed position fluid is trapped therewithin. As is apparent, the fluid under line pressure acts axially against the plug in opposite directions but the surface at the lower end of the plug being greater than the surface at the upper end of the plug which is exposed to line pressure, a true balancing of the plug within the body such as would separate the shoulder 16 and head portion is prevented. It will be obvious, however, that the line pressure in the chamber 32 is sufficient to relieve the pressure exerted by the combined action of the spring and line pressure against the lower end of the plug so that the plug may be easily rotated within the body while still being maintained in contact at the shoulder 16.

In the valve of the present invention, the sealing element 62 is arranged within the lubricant chamber 34, and thus the plug B is free to shift radially within the body; this in contra-distinction to the old practice of providing a stuffing box or other packing between the stem of the plug and the head portion of the valve, which stuffing box or packing prevents true radial shifting of the plug in the body and oftentimes results in "cocking" of the plug in the body which obviously interferes with easy operation of the valve.

Lubricants or greases in general being semisolid do not conform to the laws of pressure of liquids, and, in the valve of the present invention, the pressure developed in the upper end portion of the valve, and more particularly within the lubricant chamber 34, will be considerably in excess of the pressure adjacent the lower end portion of the valve. In this connection the circumferential groove 58 provides for arresting the flow of lubricant axially of the plug and prevents lubricant under pressure from passing below the plug. In other words, the provision of the arresting groove 58 prevents passage of lubricant to the space between the base plate 8 and the bottom of the plug such as would fill the space with lubricant under pressure as is the case in patent to Milliken 1,915,068 or Re. 17,337 to the same inventor. As is well known in the art, in valves of the type shown herein, the plug becomes coated with a thin film of lubricant. This lubricant is semi-solid and hence does not flow freely. When in closed position and the plug therefore shifted radially in the body, line pressure will pass between the plug and its seat in the body both below and above the plug where it acts against the plug in opposite directions. The radial shifting of the plug is very slight because of the slight clearance between the plug and its seat and the passage of the line pressure, as mentioned above is almost instantaneous and therefore substantially no lubricant is washed from the body of the plug; this being due to the rapidity of the action of the line pressure as well as to the character of the lubricant. It is possible that a very small quantity of lubricant may be carried along with the line pressure but the amount is so slight as to be considered negligible and lubricant cannot and is not passed into either chamber 32 or space 68 such as to be under pressure and any lubricant which may have passed into chamber 32 or space 68 is washed out when the valve is again moved to open position. It can be seen therefore, that grooves 40 and 58 constitute effective arresting grooves which normally prevent passage of lubricant under pressure to chamber 32 and space 68. In lubricating the valve a pressure will be developed in the lubricant chamber 34 which may become sufficient to cause axial movement of the plug in the body A, this condition occurring when the pressure in chamber 34 exceeds the combined action of the spring 12 and the action of line pressure against the lower end of the plug. Should this axial movement be in excess of the inherent resiliency of the sealing element 62, the latter will be disengaged from its sealing engagement with the gland C and thus permit escape of lubricant under pressure from chamber 34 through the space 30 between the stem 28 and gland C and thus provide visual means for indicating proper lubrication of the valve. When, because of leakage of excess lubricant from chamber 34, the pressure within said chamber diminishes to a point below the combined action of the spring 12 and line pressure against the lower end of the plug, the plug will shift in the opposite direction to again place the sealing element 62 in engagement with the gland C. During axial shifting of the plug in one direction it is apparent that the seating surface of the shoulder and the upper surface of the plug will be separated and lubricant under pressure may pass into the line pressure chamber 32. In this event any lubricant which may have passed into the chamber 32 will be discharged through the port 64 into the interior of the plug B to be subsequently carried away by fluid passing through the plug.

From the above description it is believed that those skilled in the art will recognize that a valve is provided which is not strictly a balanced valve within the meaning of the term "balanced" as used in the art, but which may be termed balanced to a large degree in that line pressure acts against the opposite end portions of the plug but, because of the differential existing between the upper and lower ends of the plug which are subjected to line pressure, the line pressure is not sufficient to separate the shoulder 16 and the seating surface at the upper end of the plug. The spring 12 also functions in addition to line pressure against the lower end of the plug to maintain the shoulder 16 in engagement with the upper end of the plug, and it will be apparent that by properly proportioning the spring and the areas of the plug subjected to line pressure, a valve is provided which is easy to operate in service.

The drawings herein illustrate one embodiment of this invention, but it is to be understood that they are for illustrative purposes only and various changes in the form and proportion of the valve may be made within the scope of the appended claims without departing from the spirit of the invention.

What is claimed is:

1. In a valve comprising a body, a plug rotatably and slidably mounted in the body, spring means acting on the plug and normally urging the latter axially in the body in one direction, a head portion for the valve overlapping the plug in spaced relation, said head portion and plug having portions arranged in contacting relation in such a manner as to provide spaced chambers between the head portion and plug, one of said chambers being arranged adjacent the body, and a port connecting the interior of the plug with the chamber adjacent the body.

2. In a valve, a body, a plug rotatably and slidably mounted in the body, spring means acting on the plug in such a manner as to normally urge it axially in one direction, a head portion for the valve overlapping the plug in spaced relation, said head portion and plug having portions arranged in contacting relation in such a manner as to provide a lubricant chamber and a fluid pressure receiving chamber between the head portion and plug, said fluid pressure receiving chamber being arranged adjacent the body, a port connecting the interior of the plug with said fluid receiving chamber to pass fluid under pressure to said fluid receiving chamber whereby to act against the plug in opposition to said spring means, and a resilient sealing element arranged in the lubricant chamber and in contact with the head portion and plug.

3. In a valve, a body, a plug rotatably and slidably mounted in the body and provided with a stem, a head portion for the valve overlapping the upper end of the plug in spaced relation and said plug and head portion having portions thereof arranged in contacting relation so as to provide concentrically arranged chambers, one arranged adjacent the body and the other surrounding the stem and being adapted to hold lubricant, means permitting passage of fluid under line pressure from the interior of the plug to said first named chamber, a resilient sealing element arranged in the lubricant chamber and contacting with the head portion and plug to seal the lubricant chamber against leakage of lubricant, means for forcing lubricant into said lubricant chamber, and spring means acting against the lower end of the plug and adapted to yield upon movement of the plug axially in the body in response to pressure within the lubricant chamber in excess of the combined action of the spring means and line pressure against the lower end of the plug.

4. In a valve, a body, a plug rotatably and slidably mounted in the body and provided with a stem, a head portion for the body overlapping the plug and provided with a depending shoulder with which the upper end of the plug normally contacts whereby to provide adjacently arranged chambers extending entirely around the stem, one thereof being arranged immediately adjacent the stem and being adapted to hold lubricant while the other is arranged adjacent the body, a leak port extending between the interior of the plug and the chamber adjacent the body chamber, and a sealing element interposed between the head portion and plug and within the lubricant chamber.

5. In a valve, a body, a plug rotatably mounted in the body and provided with a stem, a seat formed on the upper end portion of the body, a head portion for the valve secured to the seat and overlapping the upper end of the plug in spaced relation thereto, said head portion and the upper end of the plug having portions thereof arranged in contacting relation intermediate the stem and the body whereby to provide spaced chambers between the plug and head portion, one chamber being arranged adjacent the body and the other chamber being immediately adjacent the stem and being adapted to hold lubricant under pressure, means for forcing lubricant under pressure into said lubricant holding chamber, a port connecting the interior of the plug with the chamber adjacent the body to permit passage of fluid under line pressure to said chamber, a resilient metal sealing element in said lubricant chamber and contacting with the head portion and plug to normally seal the lubricant chamber against leakage, and spring means acting against the lower end of the plug and adapted to yield in response to axial movement of the plug in the body when the pressure within the lubricant chamber exceeds the spring action whereby to cause separation of the sealing element and head portion and permit leakage of excess lubricant from the lubricant chamber.

6. In a lubricated valve, a body having an internal plug seat, a head portion for the body, a hollow plug rotatably mounted in the body and provided with a stem extending through the head portion, spring means acting against the lower end of the plug to normally maintain the upper end of the plug in engagement with the head portion, chambers defined between overlapping portions of the plug and head portion, means for maintaining lubricant under pressure in one of said chambers, the other of said chambers being arranged adjacent the body whereby line pressure may pass thereinto between contiguous surfaces of the plug and body, and a leak port connecting said last named chamber with the interior of the plug.

7. In a valve, a body including a head portion, a plug rotatable in the body, abutment means on the head portion with which the upper end portion of the plug contacts so arranged as to form a substantially closed chamber between the plug and head portion, and means for lubricating the seating surfaces of the plug and body to seal the valve against leakage, said chamber receiving fluid under line pressure to tend to shift the plug away from the abutment means.

8. In a lubricated valve, a valve body having a head portion, a movable valve plug within the body, means at the head portion spacing said plug and head portion to form adjacently arranged substantially closed chambers, means to supply lubricant to at least one of said chambers, another of said chambers being so arranged as to receive line pressure, said chambers acting in conjunction whereby the pressure supplied thereto tends to shift the plug axially in the body away from the head portion.

9. In a lubricated valve, a valve body having a head portion and a base portion, a movable plug within the body, means at the head portion spacing said plug and head portion to form adjacently arranged substantially closed chambers, said plug being radially shiftable in the body when in closed position under the influence of line pressure exerted thereagainst whereby line pressure passes beneath the plug to act axially thereagainst to maintain the plug and head portion in contacting relation, and means to supply lubricant under pressure to at least one of said chambers, the other of said chambers being so arranged as to receive line pressure whereby to reduce the pressure of the plug against the spacing means.

10. In a lubricated valve, a body having a head portion, a plug within the body having a stem, means operative to force the plug into engagement with the head portion, means at the head portion for reducing the pressure of the plug against the head portion, sealing means interposed between the plug and head portion and surrounding the stem to provide a wall of a lubricant chamber, and means for forcing lubricant under pressure to said chamber and to the seating surfaces of the plug and body whereby to provide in said chamber the remainder of the force necessary to shift the plug away from the head portion to permit escape of excess lubricant past the sealing means and out of the valve.

11. In a lubricated valve, a valve body having a head portion and a base portion, a valve plug in said body, means at the head portion spacing said plug and head portion to form adjacently arranged substantially closed chambers, said plug being radially shiftable in the body under the influence of line pressure exerted thereagainst whereby line pressure passes beneath the plug to act axially thereagainst to urge the plug into contacting relation with said spacing means, one of said chambers receiving line pressure to act axially against the plug to counteract a predetermined part of the pressure exerted beneath the plug, and means to supply lubricant under pressure to another chamber to seal the valve against leakage.

12. In a lubricated valve, a valve body having a head portion, a stemmed valve plug in said body, said plug being radially shiftable in the body to permit passage of line pressure therebeneath to force the plug into engagement with the head portion, said plug and head portion being relatively so formed as to permit passage of line pressure therebetween to counteract a part of the pressure exerted beneath the plug, and additional means at the head portion adapted to lubricate the seating surfaces of the plug and body and also capable of exerting force against the plug sufficient to shift the plug axially in the body out of engagement with the head portion to permit escape of excess lubricant from the valve.

13. In a valve, a body having a head portion, a plug in the body having a stem, means providing a lubricant seal in the body around the stem to prevent leakage from the valve, said plug and body being relatively so formed as to permit passage of line pressure beneath the plug to force the latter into engagement with the head portion and to permit passage of line pressure between the plug and head portion, the area exposed to line pressure at the top of the plug being less than that exposed to line pressure at the bottom of the plug thereby reducing the pressure of the plug against the head portion.

ROBERT CLADE.